W. D. McNAULL.
TIRE FOR VEHICLE WHEELS.
APPLICATION FILED JAN. 28, 1911.
1,004,582.
Patented Oct. 3, 1911.
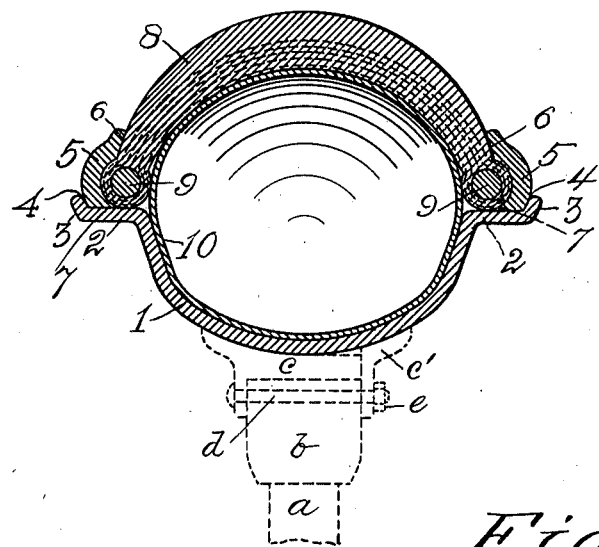
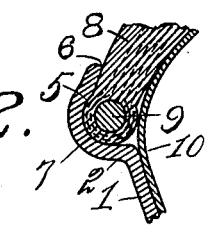
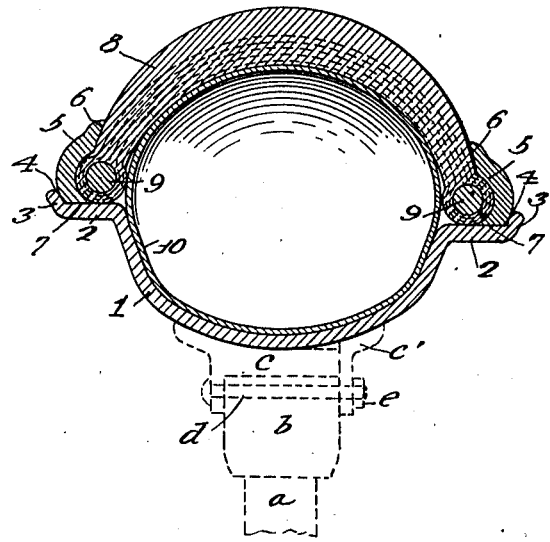
WITNESSES:
INVENTOR:

UNITED STATES PATENT OFFICE.

WILLIAM D. McNAULL, OF TOLEDO, OHIO.

TIRE FOR VEHICLE-WHEELS.

1,004,582. Specification of Letters Patent. Patented Oct. 3, 1911.

Application filed January 28, 1911. Serial No. 605,143.

*To all whom it may concern:*

Be it known that I, WILLIAM D. Mc-NAULL, a citizen of the United States, residing at Toledo, in the county of Lucas and State of Ohio, have invented certain new and useful Improvements in Tires for Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In pneumatic tire practice, as these tires are usually constructed, the chief objections encountered arise first from their original cost, due largely to the quantity of rubber employed and the high price of this material, and second, to the short life of these tires owing to their rapid wear and the frequency with which the outer and inner members of the tire are punctured or broken.

The present invention is designed to obviate to a great extent the first of these objections by reducing to a minimum the area of the casing or outer member of the tire and—consequently—the amount of rubber employed in its manufacture, without diminishing the resiliency of the tire. Also to overcome largely the second difficulty referred to by constructing the sides of the structure of metal, thus furnishing an armor which protects what is usually the most vulnerable part of the tire and which prevents puncture of the inner pneumatic tube except through the thick tread of the casing, which mishap is an unusual occurrence.

My invention is also designed to furnish a simple construction by means of which the parts of my tire are held in operative relation by means, solely, of the elastic pressure of the inner pneumatic tube and in which the parts may be quickly and easily assembled or taken apart without the use of bolts, nuts, screws or other detachable fastenings or the use of tools, and by which the trouble and annoyance of the wear, breakage and loss of these parts are avoided.

My invention also consists in certain details of construction hereinafter described and pointed out in the claims.

I attain the objects here indicated by means of the devices, construction and arrangement of parts hereinafter described, and shown and illustrated in the accompanying drawing, in which,—

Figure 1 is a transverse sectional elevation of my tire, taken at any point in its circumference, the wheel-rim, felly and spokes being indicated in dotted lines; Fig. 2, a like view of a modified form of certain of the parts hereinafter referred to and Fig. 3 a transverse sectional elevation of a modification of my device.

Corresponding parts are indicated by like numerals of reference throughout the drawings.

In the drawings, 1 is a ring consisting of an integral band of steel, pressed, rolled or otherwise formed into a hoop having on its outer side a deep circumferential channel, the margins of which have transversely projecting flanges 2. These flanges form circumferential shoulders and terminate in lips 3 which form upon the outer surface of the flanges, at their margins, circumferential stops 4.

5—5 are integral rings, the internal diameter of which corresponds to the diameter of the outer surface of the flanges 2, the inner edges of the rings being finished to fit closely upon the outer surfaces of the flanges. The rings are slightly bowed across their width, the outer edge of the rings being turned inwardly, as at 6, as shown, the arrangement being such that the flanges 2 and the rings, when in place, present at each side of the channel of the ring 1 a circumferential recess or groove 7.

8 is a flexible tire of the usual or any preferred material such as rubber, and having invested in each margin a hoop 9 consisting of a metal rod bent to hoop-form or of a bundle of wires, preferably the former. The rings 9 and the tire material with which they are enveloped together form circumferential ribs or beads which fit into and coincide with the grooves or recesses formed by the flanges 2 and the rings 5.

10 is an inner pneumatic tube provided with the usual or any preferred means for inflating the same, as will be understood without illustration.

In Fig. 1, in dotted lines, are indicated spoke $a$, felly $b$, wheel-rim $c$, retaining-ring or clip $c'$ and bolt and nut $d$—$e$, all of well known construction, and adapted to receive and hold in place the tire here described.

Of course I do not confine myself to the means here,—by way of illustration,—indicated for retaining the ring 1 in operative relation to the wheel, for other familiar methods of accomplishing this result will suggest themselves.

The parts of my device are assembled as follows: Assuming that the ring 1 is secured in place upon the wheel, the inner ring 5,—meaning the ring nearest the vehicle body,—is slipped at one of its sides into the bottom of the channel of the ring 1 (the wheel being lifted off the ground,) and the opposite side of the ring is now moved sidewise over the channel of the ring 1 so that the ring is disposed in the central vertical plane of the wheel. The ring may now be readily slipped onto its seat upon the shoulder of flange 2 and against the lip or stop 3. The pneumatic tube—deflated—is circumferentially disposed in the bottom of the channel of the ring 1. Next, the two margins of the casing or tire 8 are placed in the channel of the ring 1 by first slipping one side of the margins deep into the channel and by then swinging the diametrically opposite side of the tire-margins into the central vertical plane of the wheel. Next the outer ring 5 is seated upon its flange 2, in the manner above described, as to the inner ring, and snugly fitted against its lip or shoulder 3. Now when the inner pneumatic tube is inflated, the beads or ribs upon the margins of the casing or tire 8 are forced transversely into the channels or grooves 7 formed by the rings 8 and the shoulders of the flanges above described. The device is now substantially circular in cross-section, the outer wall being composed largely of metal and but little more than the tread of the flexible member being exposed. The outward pressure of the pneumatic tube firmly holds the rings 5 and the margins of the flexible part 8 in operative relation to each other so that they cannot move either radially or transversely until the pneumatic tube is deflated. It will be understood that it is not essential that the ring 1 should be secured in place upon the wheel to permit the assembling of the parts of my tire and rings, for obviously this operation may and should be performed with the ring 1 detached from the wheel when the tire is to be used as a spare or extra tire. The advantages, as a "spare", of my tire, inflated and ready to take its place upon a wheel, are manifest.

In Fig. 3 the outer flange 2 is shown as of slightly less diameter than the opposite flange, the ring for the outer flange being reduced in diameter accordingly. This arrangement permits the inner ring 5 to be slipped directly over the outer flange and into place without sinking one side of the ring into the channel before moving it transversely into place.

In Fig. 2, the ring 5 and the flange 2 are shown as integrally formed. It is found in practice, however, that in the construction indicated in Fig. 2, it is not so easy to assemble the parts as when the rings are made separate.

Having described my invention, what I claim and desire to secure by Letters Patent is,—

1. In a device of the described character, a demountable rim comprising a metal ring having a deep peripheral circumferential channel, tire engaging members upon the opposite margins of the channel and providing opposed circumferential grooves, combined with a flexible tread-member having beaded margins which fit into said circumferential grooves, and an inner pneumatic tube the inflation of which forces the beaded margins of the tread-member into engagement with said circumferential grooves, the transverse horizontal width of the recess formed by the channel of the rim and its tire engaging members being greater than the width of the tread-member when distended, and of such depth as to contain the tread-member and, when deflated, the pneumatic tube.

2. In a device of the character described, a tread-member of flexible material having inextensible beaded margins of rounded cross-section, a rim having a channel of greater cross sectional area than the cross sectional area of the tread-member, laterally extending shoulders at the edges of the channel supporting the tire beads, tire-retaining flanges at the outer edges of the shoulders allowing a limited inward rotary movement of the beads in the flanges, and a pneumatic tube in the channel contacting with the rim and tread-member, substantially as described.

In testimony whereof I affix my signature in presence of two witnesses.

WILLIAM D. McNAULL.

Witnesses:
CLAYTON MURPHY,
LEONE KIBURTZ.